United States Patent
Richardson et al.

(10) Patent No.: US 7,359,642 B2
(45) Date of Patent: Apr. 15, 2008

(54) MODULAR OPTICAL RECEIVER

(75) Inventors: Dean Richardson, Wilmette, IL (US);
John Dallesasse, Geneva, IL (US);
Matthew Block, Maple Park, IL (US);
Brett Lane, West Mont, IL (US);
Anthony Moretti, Saint Charles, IL (US); M. Michelle Haugen, St. Charles, IL (US)

(73) Assignee: Emcore Corporation, Albuquerque, NM (US)

( * ) Notice: Subject to any disclaimer, the term of this patent is extended or adjusted under 35 U.S.C. 154(b) by 540 days.

(21) Appl. No.: 10/896,721

(22) Filed: Jun. 23, 2004

(65) Prior Publication Data
US 2005/0105907 A1   May 19, 2005

(51) Int. Cl.
*H04B 10/24* (2006.01)
(52) U.S. Cl. ...................................... 398/135
(58) Field of Classification Search ......... 398/135–139
See application file for complete search history.

(56) References Cited

U.S. PATENT DOCUMENTS

| 6,975,642 | B2 * | 12/2005 | Levinson et al. | ........... 370/445 |
| 2001/0033729 | A1 * | 10/2001 | Kuroha | ....................... 385/138 |
| 2002/0018625 | A1 * | 2/2002 | Grann et al. | ................... 385/88 |
| 2006/0067619 | A1 * | 3/2006 | Welch et al. | .................. 385/37 |

* cited by examiner

*Primary Examiner*—Leslie Pascal

(57) ABSTRACT

A modular, hermetically sealed optical signal receiver subassembly for converting a modulated optical signal to a corresponding electrical signal including an optical demultiplexer coupled to a fiber optic connector receiving a multi-wavelength optical signal having a plurality of information-containing signals each with a different predetermined wavelength and functioning to demultiplex the optical signal into distinct first and second optical beams corresponding to the predetermined wavelength and substrate is provided that forms an optional reference path of the first and second beams respectively, the photodiodes functioning to convert the respective optical signals into an electrical signal.

16 Claims, 2 Drawing Sheets

MODULAR OPTICAL RECEIVER

REFERENCE TO RELATED APPLICATIONS

This application is related to copending U.S. patent application Ser. No. 10/879,775 filed Jun. 28, 2004, entitled Modular Optical Transceiver, assigned to the common assignee.

BACKGROUND OF THE INVENTION

1. Field of the Invention

The invention relates to optical receivers, and in particular to hermetically sealed assemblies or modules that provide a communications interface to an optical fiber, such as used in fiber optic communications links, and methods for assembling and aligning an optical fiber with optoelectronic components in such module.

2. Description of the Related Art

A variety of optical transceivers are known in the art which include an optical transmit portion that converts an electrical signal into a modulated light beam that is coupled to an optical fiber, and a receive portion that receives an optical signal from an optical fiber and converts it into an electrical signal. Traditionally, optical receive sections include an optical assembly to focus or direct the light from the optical fiber onto a photodetector, which in turn, is connected to an amplifier/limiter circuit on a circuit board. The photodectector or photodiode is typically packaged in a hermetically sealed package in order to protect it from harsh environmental conditions. The photodiodes are semiconductors chips that are typically a few hundred microns to a couple of millimeters wide and 100-500 microns thick. The package in which they are mounted is typically 3-6 mm in diameter, 2-5 mm tall and has several electrical leads coming out of the package. These electrical leads are then soldered to the circuit board containing the amplifier/limiter.

SUMMARY OF THE INVENTION

1. Objects of the Invention

It is an object of the present to provide an improved optical receiver subassembly in a hermetically sealed enclosure.

It is another object of the present invention to provide a hermetic package for use with multiple optoelectronic components mounted on a circuit board.

It is also another object of the present invention to provide a modular optical receiver subassembly for use in an optical transmission system within an industry standard XENPAK housing.

It is still another object of the present invention to provide a method for assembling components in an optical receiver module for use in an optical wavelength division multiplexed (WDM) transmission system.

It is still another object of the present invention to provide an optical transceiver capable of field upgrades of both hardware and software modules.

It is still another an object of the present to provide an improved optical receiver using an optical demultiplexer and multiple photodetectors in a single modular subassembly.

It is another object of the present invention to provide an improved method for aligning an optical fiber with an optical demultiplexer and an array of optoelectronic components.

It is also another object of the present invention to provide a hermetic seal between an optical fiber and a receiver subassembly.

2. Features of the Invention

Briefly, and in general terms, the present invention provides an optical transceiver for converting and coupling an information-containing electrical signal with an optical fiber including a housing including a fiber optic connector adapted for coupling with an external optical fiber; and a modular, hermetically sealed receiver subassembly in the housing for converting a modulated optical signal into a corresponding electrical signal.

The present invention further provides a receiver subassembly including an optical demultiplexer coupled to a fiber optic connector for receiving a multi-wavelength optical signal having a plurality of information-containing signals each with a different predetermined wavelength and demultiplexing the optical signal into distinct optical beams corresponding to the predetermined wavelengths; and a substrate forming an optical reference plane and including first and second photodiodes disposed thereon in the path of the first and second beams respectively, the photodiodes functioning to convert the respective optical signals into an electrical signal.

The present invention further provides a receiver subassembly including an optical block with a plurality of wavelength selecting elements and reflectors operative to direct the optical beams emitted from each respective wavelength selecting element to respective ones of a plurality of spatially separated image positions corresponding to the locations of individual photodetectors in a photodetector array.

In another aspect of the invention, there is provided a frame consisting of a ceramic substrate, a metal-ceramic or metal ring, and a metallic lid that are utilized to hermetically package an optical demultiplexer, a photodiode array, and associated electronic components in a single, modular subassembly.

Additional objects, advantages, and novel features of the present invention will become apparent to those skilled in the art from this disclosure, including the following detailed description as well as by practice of the invention. While the invention is described below with reference to preferred embodiments, it should be understood that the invention is not limited thereto. Those of ordinary skill in the art having access to the teachings herein will recognize additional applications, modifications and embodiments in other fields, which are within the scope of the invention as disclosed and claimed herein and with respect to which the invention could be of utility.

BRIEF DESCRIPTION OF THE DRAWINGS

These and other features and advantages of this invention will be better understood and more fully appreciated by reference to the following detailed description when considered in conjunction with the accompanying drawings, wherein.

Figure 1:
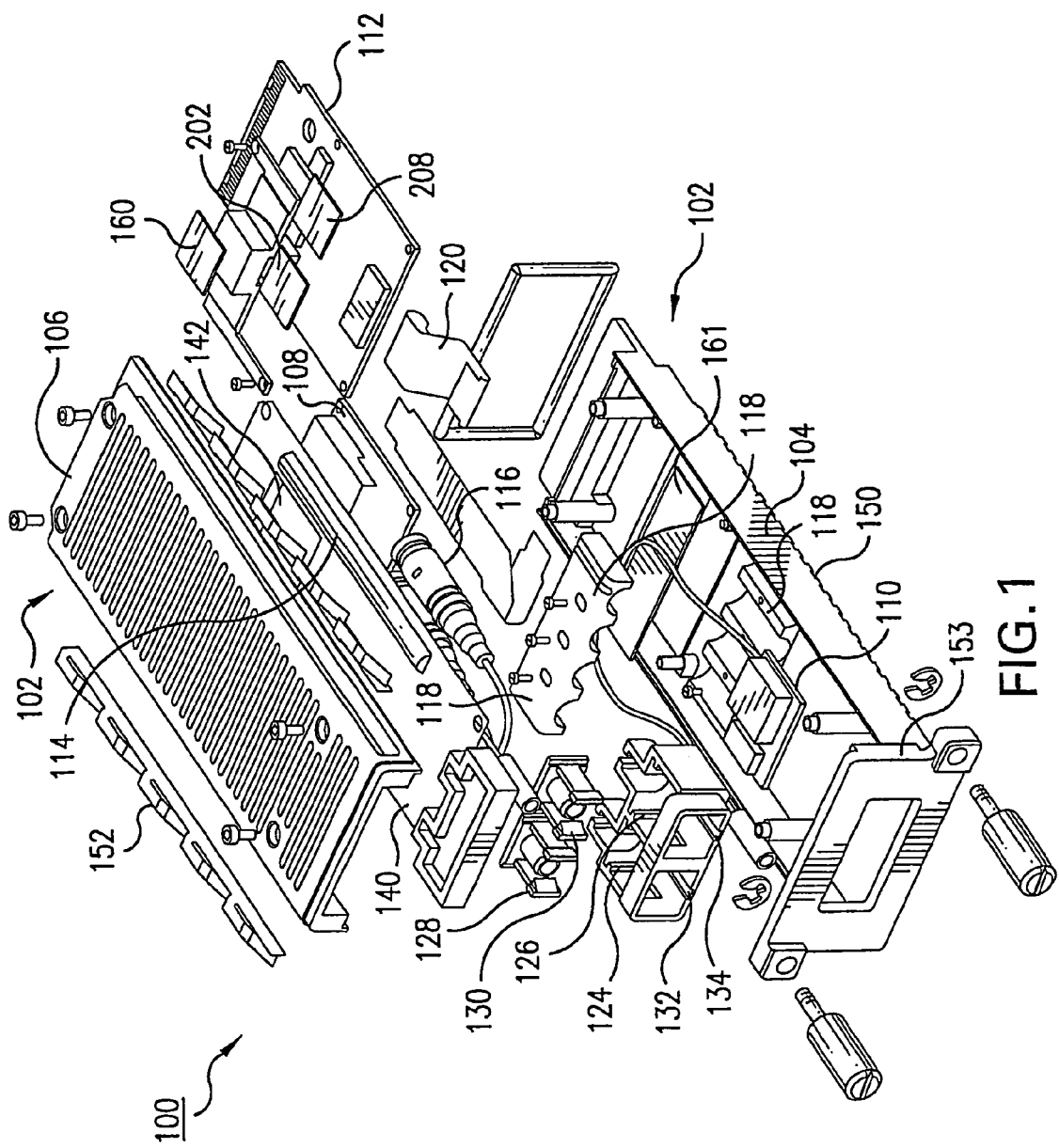
FIG. 1 is an exploded perspective view of an optical transceiver in an exemplary embodiment in accordance with aspects of the present invention.

The novel features and characteristics of the invention are set forth in the appended claims. The invention itself, however, as well as other features and advantages thereof, will be best understood by reference to a detailed description of a specific embodiment, when read in conjunction with the accompanying drawings.

DESCRIPTION OF THE PREFERRED EMBODIMENT

Details of the present invention will now be described, including exemplary aspects and embodiments thereof. Referring to the drawings and the following description, like reference numbers are used to identify like or functionally similar elements, and are intended to illustrate major features of exemplary embodiments in a highly simplified diagrammatic manner. Moreover, the drawings are not intended to depict every feature of actual embodiments or the relative dimensions of the depicted elements, and are not drawn to scale.

Referring more particularly to FIG. 1, there is provided an optical transceiver 100 for operating over both multimode (MM) and single mode (SM) fiber using multiple laser light sources, multiple photodetectors, and an optical multiplexing and demultiplexing system. This enables a single transceiver module to communicate over multiple protocols and at maximum distance goals. The transceiver 100 and its housing 102 are designed such that maximum operating efficiency is achieved cost effectively and at reduced electromagnetic interference (EMI) and thermal levels in an industry standard form factor or package design.

Advantageously, the transceiver 100 is manufactured in a modular manner preferably using three separately mounted circuit boards mounted in the housing—a transmitter subassembly, a receiver subassembly, and a protocol processing board, with each board having dedicated functions and electrically connected to each other using either flex circuitry, mating multipin connectors, land grid arrays, or other electrical interconnect devices. This enables the basic transceiver module to be configured to different protocols and to support different optoelectronic devices using a simple subassembly configuration change, thus minimizing manufacturing costs and eliminating the need for manufacturing different transceivers for each different application. In addition, the use of flex circuitry or detachable connectors to interconnect the boards allows for a modular interchangeable board design (e.g., receiver, transmitter and PCS functionality each on separate boards). Although the preferred design uses three boards, any two of the functions may be combined on a single board for an even more compact design.

The modularity of the board design also enables the placement of heat-sensitive components in the optimal location with respect to the heat-generating components (lasers and ICs) within the module housing 102. It also makes it convenient and realistic to test and troubleshoot separate modular subassemblies independently before final assembly. In addition, the flex or other interconnects allow for manufacturing of the various boards (RX, TX, PCS) to proceed in parallel instead of in serial, hence reducing the manufacturing time for the entire unit.

Figure 2:
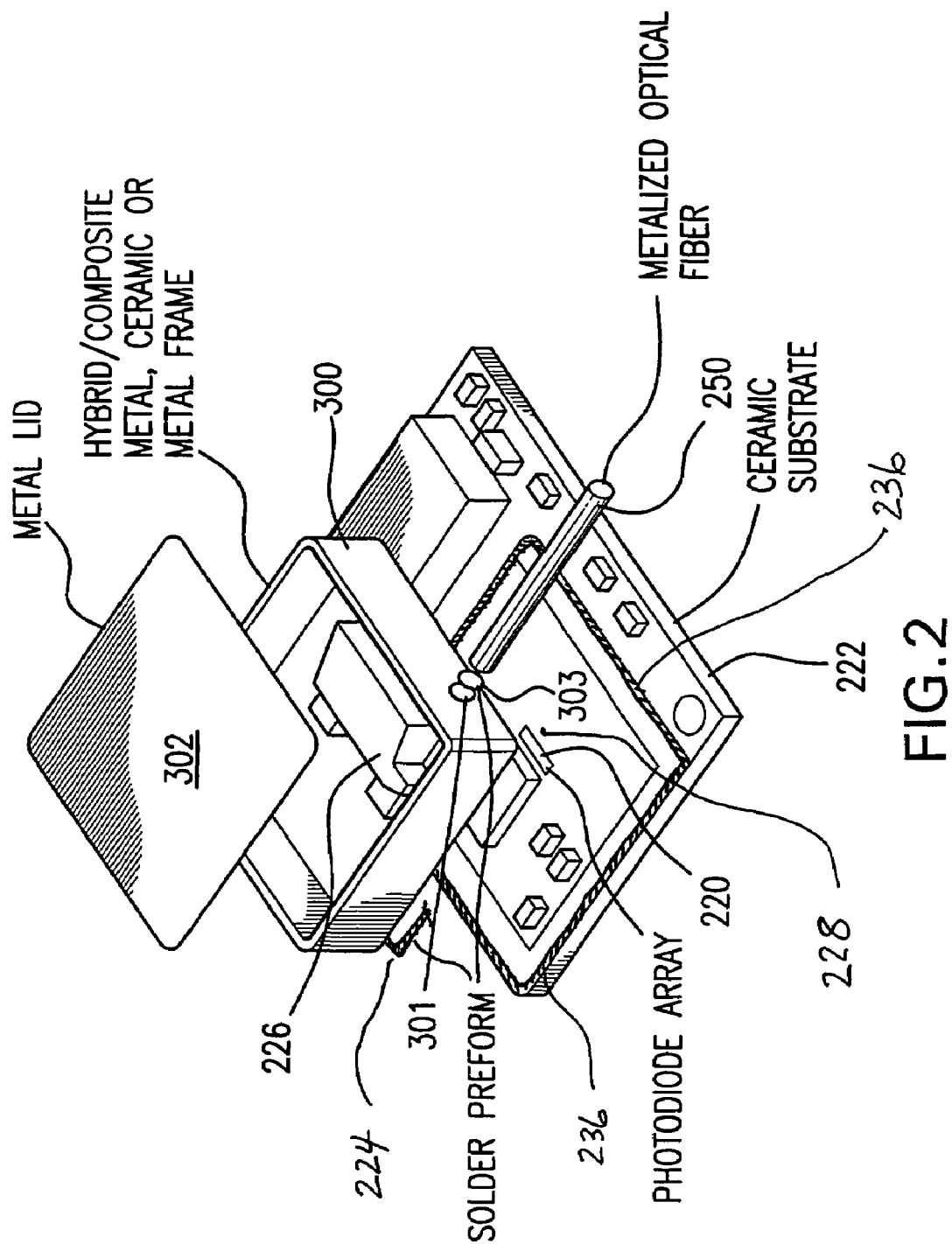
FIG. 2 is an exploded perspective view of a hermetically sealed receiver subassembly.

Referring now to FIGS. 1 and 2, an exemplary optical transceiver module 100 is shown according to a preferred embodiment of the present invention. In this particular embodiment, the module 100 is compliant with the IEEE 802.3ae-2002 10GBASE-LX4 Physical Media Dependent sub-layer (PMD) and the XENPAK™ form factor. It is to be noted, however, that the transceiver module 100 may be configured to operate under various other compliant protocols (such as Fibre Channel or SONET) and be manufactured in various alternate form factors such as X2. The module 100 is preferably a 10 Gigabit Coarse Wavelength Division Multiplexed (CWDM) transceiver having four 3.125 Gbps distributed feedback lasers and providing 300 meter transmission over legacy installed multimode fiber and from 10 to 40 km over standard single mode fiber.

The transceiver module 100 includes a two-piece housing 102 with a base 104 and a cover 106. In addition, contact strips 152 are provided to ground the module to chassis ground as well. The housing 102 is constructed of die-cast or milled metal, preferably die-cast zinc, although other materials also may be used, such as specialty plastics and the like. Preferably, the particular material used in the housing construction assists in reducing EMI. Further EMI reduction may be achieved by using castellations (not shown) formed along the edges of the housing 102.

The front end of the housing 102 includes a faceplate 153 for securing a pair of receptacles 124, 126. The receptacles 124, 126 are configured to receive fiber optic connector plugs 128, 130. In the preferred embodiment, the connector receptacles 128, 130 are configured to receive industry standard SC duplex connectors (not shown). As such, keying channels 132 and 134 are provided to ensure that the SC connectors are inserted in their correct orientation. Further, as shown in the exemplary embodiment and discussed further herein, the connector receptacle 130 receives an SC transmitting connector and the connector receptacle 128 receives an SC receiver connector.

In particular, the housing 102 holds three circuit boards, including a transmit board 108, a receive board 110 and a physical coding sublayer (PCS)/physical medium attachment (PMA) board 112, which is used to provide an electrical interface to external electrical systems (not shown). An optical multiplexer (MUX) 114 interfaces to the transmit board 108 via an assembly of four distributed feedback (DFB) lasers 116 in TO-cans. The lasers 116 are secured in place at the bottom of the housing 102 using a laser brace 118. The laser brace 118 also functions as a heat sink for cooling the lasers 116. In addition, the transmit board 108 and receive board 110 are connected to the PCS/PMA board 112 by respective flex interconnect 120, or other board-to-board connectors. Thermally conductive gap pads 160 and 161 are provided to transmit the heat generated by the lasers or other components to the base 104 or cover 106 of the housing, which acts as a heat sink. The receiver subassembly 110 is directly mounted on the housing base 104 using a thermally conductive adhesive to achieve heat dissipation. Different subassemblies therefore dissipate heat to different portions of the housing for more uniform heat dissipation. The output of the four lasers 116 is then input into the optical MUX 114. The MUX 114 is mounted on a flexible substrate 140. The substrate 140 may be an optical flexible planar material, such as FlexPlane™ available from Molex, Inc. of Lisle, Ill., although other flexible substrate may be used as well. The optical fibers originating from the laser assembly 116 and being input into the MUX 114 are mounted to the substrate 140. The output of the MUX 114, which is routed to the transmit connector plug 130, is also attached to the substrate 140. The fibers are routed and attached in such a manner as to minimize sharp bends in the optical fibers to avoid optical loss and mechanical failure.

The substrate 140 includes an opening 142 or hole in a portion of the material that is located directly above the retimer IC or other heat generating components mounted on the PCS/PMA board 112. The opening 142, which is substantially an area the size of the unused portion of the substrate 140, enables the heat sink on the cover to contact a heat transmission gap pad 160, so as to provide access to the mounted components on the board. This area normally would be inaccessible if not for the opening 142. For example, a heat sink may be installed without interfering with the routing of the optical fibers on the substrate 140 and without removing the mounted substrate 140 to allow access to the PCS/PMA board 112.

Several additional advantages are realized in using the flexible substrate 140. In particular, attaching the fibers to the substrate 140, rather than allowing the fibers to move about freely within the transceiver module housing 102, neatly maintains the routing of the optical fibers to prevent unwanted tangling and breakage during assembly of the transceiver. Furthermore, attaching the optical fibers to the substrate 140 greatly reduces the stress on the fibers, thereby reducing the incidence of microcracks forming in the fiber coatings.

In the case of WWDM receive sections there needs to be a detector for each wavelength. It is evident that the use of multiple photodetectors in separate hermetic cans would result in a large receive section for such multi-wavelength receivers. Instead, a single multi-element photodiode array is mounted directly to the circuit board containing the amplifier/limiter circuit. A miniature optical demultiplexer is aligned to the photodiode array.

As shown in FIG. 2, in order to provide a hermetic environment to the receiver components, the receiver components are enclosed in a hermetic package. The bottom of the package is the circuit board itself. Since standard fiberglass and glass-epoxy materials are not impervious to water, the circuit board is made from ceramic materials such as LTCC (low temperature co-fired ceramic). A moisture-impervious enclosure is then attached to the LTCC board to surround the photodiode array, miniature optical demultiplexer and, amplifier/limiter IC.

The enclosure can be composed of a frame 300 and a metal lid 302. The frame is sealed to the circuit board 222 using standard hermetic sealing methods. One such method is to place a solder preform 224 on the LTCC board 222. This preform 224 is sandwiched between a metal trace 236 on the LTCC board 222 and the frame 300 walls. Alternatively, solder paste can be deposited on the metal traces and the metal frame can be placed on the paste. This allows for standard SMT assembly techniques to be used. The frame 300 can be placed during the same SMT operation as other components, and the solder is reflowed to attach the frame 300 to the LTCC board 222. The optical demultiplexer 226 is then aligned to the photodiode array 220 and fixed to the circuit board 222. The optical fiber 250 is then aligned and fixed to the demultiplexer 226. The lid 302 is attached to the frame 300 using standard hermetic sealing techniques such as soldering, welding, or seam sealing.

The frame 300 contains a hole 301 or cutout that serves as a feedthrough for the optical fiber 250. The optical fiber 250 needs to be metalized in the region where it penetrates the cutout 301. This allows the feedthrough to be hermetically plugged with solder. The approach described hereinabove results in a package that is fully hermetic.

Referring to FIGS. 1 and 2 the receiver subassembly 110 with the circuit board 222 acts as an optical bench for the attachment and alignment of the demultiplexer 226 to the photodiode array 220. In particular, there is shown a miniature optical demultiplexer 226 aligned to the photodiode array 220, resulting in a compact receive section. The circuit board 222 not only serves as a substrate for the electrical circuitry, but also serves as an optical bench for the optical components. Particularly, the surface of the circuit board 222 acts as the optical reference plane 228 for the optical components. Optionally, the receiver board 222 is a printed circuit board (PCB) formed from PCB materials having higher glass content and providing less signal loss under high frequency (RF) operation compared to less expensive PCB materials. A suitable material is Rogers RO4003, available form Rogers Corp. of Chandler, Arizona, which is less expensive than either ceramic or silicon. The use of ceramic or silicon provides the ability to make the package hermetic.

The surface of the circuit board 222 is the optical reference plane 228. The top surface of the photodiode array 220 is set to a predetermined height by controlling its thickness to within 50 microns and the thickness of its attachment material such as glue or solder (not shown). The demultiplexer 226 is also attached to this surface. The demultiplexer output (not shown) is thus at a predetermined height of within 50 microns above the photodiode array 220.

More particularly, the photodiode array 220 has a variable thickness from lot to lot and is attached to the circuit board 222 with epoxy, solder or eutectic metal bonding of variable thickness. The thickness of the bond material is manufactured to a controlled thickness such that the active surface of the photodiodes is at a predetermined height above the circuit board surface so as to match the focus distance. The miniature optical demultiplexer 226 is then aligned relative to the active areas of the photodiode array 220 in a plane parallel to the photodiode array surface. The demultiplexer 226 has a precise thickness such that when it rests on the optical reference plane 228 defined by the circuit board surface, the optical exit surfaces of the demultiplexer 226 are at the correct height above the photodiode array 220.

The demultiplexer 226 utilized and implemented in the present invention is preferably that described in U.S. Pat. No. 6,542,306, hereby incorporated by reference, and includes an optical block with an upper surface and a lower portion. The optical block has at least one optical element and a plurality of wavelength selecting elements and reflectors. The optical block is specifically positioned on top of a beam-directing member. In the preferred embodiment of the present invention, both the optical block and beam-directing member are optically transparent.

In particular, as described in the above noted U.S. patent, at least one optical element is disposed generally on the upper surface of the optical block. Its function is primarily to focus and direct a multi-wavelength optical signal along a prescribed optical signal path. Further, the wavelength selecting elements are disposed generally below the upper surface of the optical block. The wavelength selecting elements are designed and operative to receive the optical signal from the optical element. Moreover, a plurality of reflectors are disposed generally on the upper surface of the optical block and opposite from the wavelength selecting elements. Due to such strategic positioning and orientation, the reflectors are able to direct the optical signal from one wavelength selecting element to an adjacent wavelength selecting element. Thereafter, the beam-directing member, which is disposed about the lower portion of the optical block, operates to redirect and focus the optical signal from the wavelength selecting elements to the photodiode array 220. Although the demultiplexer described above is preferred, other optical configurations for demultiplexing the signals may be used as well, and such alternative configurations are within the scope of the present invention.

The present invention implements the transceiver 100 utilizing the four standard, commercially available fiber pigtailed lasers 116 which interfaces to a Fused Biconic Tapered (FBT) coupler 114 to collect and multiplex laser radiation into a single fiber. The fiber that is used in the fiber pigtailed lasers 116 and the FBT 114 is affixed to the flexible substrate material 140. This prevents fiber tangling and breakage while remaining flexible and therefore easy to work with. The flexible substrate material 140 may be an optical flexible planar material, such as FlexPlane™ available from Molex, Inc, of Lisle, Ill., or Kapton™ available from E.I. Dupont de Nemours and Company of Wilmington Del. Other flexible substrates may be used as well. A conforming coating is used over the entire flex 140 is used to secure the fibers to the flex 140.

As previously noted above, several additional advantages are realized when using the flexible substrates 140 rather than allowing the fibers to move about freely within the transceiver module housing 102, neatly maintains the routing of the optical fibers to prevent unwanted tangling. Furthermore, attaching the optical fibers to the substrate 140 greatly reduces the stress on the fibers, thereby reducing the incidence of microcracks forming in the fiber coatings. The fibers are routed and attached in such a manner as to minimize sharp bends in the optical fibers.

It will be understood that each of the elements described above, or two or more together, also may find a useful application in other types of constructions differing from the types described above.

While the invention has been illustrated and described as an optical receiver subassembly embodied in a transceiver for an optical communications network, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed is:

1. In an optical transceiver converting and coupling an information-containing electrical signal with an optical fiber having a housing including a fiber optic connector adapted for coupling with an external optical fiber for transmitting and/or receiving an optical communications signal, a modular, hermetically sealed receiver subassembly for converting between an information-containing optical signal and a modulated electrical signal corresponding to the optical signal, the receiver subassembly comprising:
   an optical demultiplexer within the modular, hermetically sealed receiver subassembly, said optical demultiplexer for receiving a multi-wavelength optical signal having a plurality of information-containing signals each with a different predetermined wavelength, and for demultiplexing the optical signal into distinct optical beams corresponding to said predetermined wavelengths; and
   a photodiode array within the modular, hermetically sealed receiver subassembly, said photodiode array in the path of said optical beams and functioning to convert the respective optical signals into electrical signals.

2. The subassembly as defined in claim 1, wherein the photodiode array is mounted on a generally planar support forming an optical reference plane.

3. The subassembly as defined in claim 2, wherein the support is a ceramic substrate.

4. The subassembly as defined in claim 2, further comprising a bonding material deposited on the planar support for securing the photodiode array to the planar support, wherein the thickness of the bond material is selected to control the height of the photodiode array over the support to thereby ensure that the beams from the optical demultiplexer focus on the photodiode array.

5. The subassembly as defined in claim 2, further comprising a metallic frame member mounted on said support and enclosing the demultiplexer and photodiode array.

6. The subassembly as defined in claim 5, further comprising a metallic lid member mounted on said frame member thereby forming a sealed cavity enclosing the demultiplexer and photodiode array.

7. The subassembly as defined in claim 5 further comprising an aperture in the metallic frame member for allowing an optical fiber to enter the interior of the frame member.

8. The subassembly as defined in claim 7, wherein an optical fiber is attached to the frame member and extends into the interior so as to optically couple with the optical demultiplexer.

9. The subassembly as defined in claim 7, wherein an optical fiber has a metallized surface and is soldered to the frame member so as to form a hermetic seal around the aperture.

10. The subassembly as defined in claim 1, wherein the optical demultiplexer includes an optical block having a plurality of wavelength selecting elements and reflectors operative to direct the optical beams from each respective wavelength selecting element to respective ones of a plurality of spatially separated image positions corresponding to the locations of the individual photodiodes in the photodiode array.

11. In an optical transceiver converting and coupling an information-containing electrical signal with an optical fiber having a housing including a fiber optic connector adapted for coupling with an external optical fiber for transmitting and/or receiving an optical communications signal, a modular, hermetically sealed receiver subassembly for converting between an information-containing optical signal and a modulated electrical signal corresponding to the optical signal, the receiver subassembly comprising:
   an optical demultiplexer within the modular, hermetically sealed receiver subassembly, said optical demultiplexer for receiving a multi-wavelength optical signal having a plurality of information-containing signals each with a different predetermined wavelength, and for demultiplexing the optical signal into a plurality of distinct optical beams corresponding to said predetermined wavelengths; and
   a generally planar support within the modular, hermetically sealed receiver subassembly, said planar support forming an optical reference plane and including first and second photodiodes disposed thereon in the path of a first and second optical beams respectively, said first and second optical beams selected from said plurality of distinct optical beams, the photodiodes functioning to convert the respective optical signals into an electrical signal that is coupled to said electrical connector for transmitting the electrical signal to an electrical cable or external information system device.

12. The subassembly of claim 11, wherein the planar support is composed of Rogers (TM) material.

13. The subassembly of claim 11, wherein the optical demultiplexer includes an optical block with a plurality of wavelength selecting elements and reflectors operative to direct the optical beams from each respective wavelength selecting element to respective ones of a plurality of spatially separated image positions corresponding to the locations of the first and second photodiodes.

14. The subassembly as defined in claim 11, further comprising a metallic lid member mounted on said support and enclosing the demultiplexer and photodiodes.

15. In an optical transceiver converting and coupling an information-containing electrical signal with an optical fiber having a housing including a fiber optic connector adapted for coupling with an external optical fiber for transmitting and/or receiving an optical communications signal, a modular, hermetically sealed receiver subassembly for converting between an information-containing optical signal and a modulated electrical signal corresponding to the optical signal, the receiver subassembly comprising:

an optical demultiplexer within the modular, hermetically sealed receiver subassembly, said optical demultiplexer for receiving a multi-wavelength optical signal having a plurality of information-containing signals each with a different predetermined wavelength, and for demultiplexing the optical signal into distinct optical beams corresponding to said predetermined wavelengths;

a photodiode array within the modular, hermetically sealed receiver subassembly, said photodiode array in the path of said optical beams and functioning to convert the respective optical signals into electrical signals, said photodiode array mounted on a generally planar support forming an optical reference plane; and a metallic frame member within the modular, hermetically sealed receiver subassembly, said metallic frame member mounted on said support and enclosing the demultiplexer and photodiode array, wherein said metallic frame member comprises an aperture for allowing an optical fiber to enter the interior of the frame member.

16. In an optical transceiver converting and coupling an information-containing electrical signal with an optical fiber having a housing including a fiber optic connector adapted for coupling with an external optical fiber for transmitting and/or receiving an optical communications signal, a modular, hermetically sealed receiver subassembly for converting between an information-containing optical signal and a modulated electrical signal corresponding to the optical signal, the receiver subassembly comprising:

an optical demultiplexer within the modular, hermetically sealed receiver subassembly, said optical demultiplexer for receiving a multi-wavelength optical signal having a plurality of information-containing signals each with a different predetermined wavelength and demultiplexing the optical signal into a plurality of distinct optical beams corresponding to said predetermined wavelengths; and a generally planar support within the modular, hermetically sealed receiver subassembly, said planar support forming an optical reference plane and including first and second photodiodes disposed thereon in the path of a first and second optical beams respectively, said first and second optical beams selected from said plurality of distinct optical beams, the photodiodes functioning to convert the respective optical signals into an electrical signal that is coupled to said electrical connector for transmitting the electrical signal to an electrical cable or external information system device, wherein the optical demultiplexer includes an optical block with a plurality of wavelength selecting elements and reflectors operative to direct the optical beams from each respective wavelength selecting element to respective ones of a plurality of spatially separated image positions corresponding to the locations of the first and second photodiodes.

* * * * *